: US010274038B2

United States Patent
Smith

(10) Patent No.: US 10,274,038 B2
(45) Date of Patent: Apr. 30, 2019

(54) END CLOSURES AS WELL AS GAS SPRING ASSEMBLIES AND METHODS OF ASSEMBLY INCLUDING SAME

(71) Applicant: Firestone Industrial Products Company, LLC, Indianapolis, IN (US)

(72) Inventor: Jason B. Smith, Avon, IN (US)

(73) Assignee: Firestone Industrial Products Company, LLC, Nashville, TN (US)

( * ) Notice: Subject to any disclaimer, the term of this patent is extended or adjusted under 35 U.S.C. 154(b) by 101 days.

(21) Appl. No.: 15/033,474

(22) PCT Filed: Nov. 14, 2014

(86) PCT No.: PCT/US2014/065682
§ 371 (c)(1),
(2) Date: Apr. 29, 2016

(87) PCT Pub. No.: WO2015/073811
PCT Pub. Date: May 21, 2015

(65) Prior Publication Data
US 2016/0252154 A1   Sep. 1, 2016

Related U.S. Application Data

(60) Provisional application No. 61/905,070, filed on Nov. 15, 2013.

(51) Int. Cl.
*F16F 9/04*   (2006.01)
*F16F 9/05*   (2006.01)
(Continued)

(52) U.S. Cl.
CPC ............. *F16F 9/057* (2013.01); *B60G 11/27* (2013.01); *B60G 17/0521* (2013.01);
(Continued)

(58) Field of Classification Search
CPC .. F16F 9/057; F16F 9/05; F16F 9/0463; F16F 9/0454; F16F 2226/04; B60G 11/27;
(Continued)

(56) References Cited

U.S. PATENT DOCUMENTS

2008/0111288 A1* 5/2008 Howard ............... F16F 9/0409
  267/64.27
2008/0315474 A1* 12/2008 Koeske ................. B60G 11/62
  267/220

(Continued)

FOREIGN PATENT DOCUMENTS

DE    102011112429   3/2013
EP          2088009   8/2009
WO    WO2008/097960   8/2008

OTHER PUBLICATIONS

International Search Report and Written Opinion for corresponding patent application No. PCT/US2014/065682 dated Apr. 2, 2015.

*Primary Examiner* — Karen Beck
(74) *Attorney, Agent, or Firm* — Brian D. McAlhaney; Fay Sharpe LLP

(57) ABSTRACT

An end closure (260) is dimensioned for securement to a gas spring end member (204). The end closure is dimensioned to form a substantially fluid-tight, friction-fit connection with a flexible spring member (206) that is in an at least substantially-cured condition. The end closure (260) can include an end wall portion (298), a first side wall portion (300) that extends from along the end wall portion (298) and a second side wall portion (304) that is disposed radially inward of the first side wall portion and is axially-offset relative to the end wall portion. The second side wall portion at least partially forms a mounting seat that is dimensioned to form a substantially fluid-tight, friction-fit connection between at least the second side wall portion of the end closure (260) and the flexible spring member (204). A gas spring assembly as well (Continued)

as a suspension system and methods of assembly are also included.

16 Claims, 9 Drawing Sheets

(51) Int. Cl.
*B60G 11/27* (2006.01)
*B60G 17/052* (2006.01)

(52) U.S. Cl.
CPC .......... *F16F 9/0454* (2013.01); *F16F 9/0463* (2013.01); *F16F 9/05* (2013.01); *B60G 2202/152* (2013.01); *B60G 2206/42* (2013.01); *B60G 2206/82* (2013.01); *B60G 2500/201* (2013.01); *B60G 2500/30* (2013.01); *F16F 2226/04* (2013.01)

(58) Field of Classification Search
CPC .... B60G 11/28; B60G 15/12; B60G 17/0521; B60G 2206/42; B60G 2500/30; B60G 2206/82; B60G 2202/152; B60G 2500/201
See application file for complete search history.

(56) References Cited

U.S. PATENT DOCUMENTS

| | | | | |
|---|---|---|---|---|
| 2012/0161375 A1* | 6/2012 | Koeske | .................. | B60G 11/27 267/64.27 |
| 2013/0207329 A1* | 8/2013 | Leonard | ................. | B60G 11/62 267/220 |

* cited by examiner

END CLOSURES AS WELL AS GAS SPRING ASSEMBLIES AND METHODS OF ASSEMBLY INCLUDING SAME

BACKGROUND

The subject matter of the present disclosure broadly relates to the art of gas spring devices and, more particularly, to end closures dimensioned for snap-fit engagement with an end of a flexible spring member and for securement on or along a corresponding end member to at least partially form a gas spring assembly. Gas spring assemblies including such end closures as well as suspension systems that include one or more of such gas spring assemblies, and methods of assembly are also included.

The subject matter of the present disclosure may find particular application and use in conjunction with components for wheeled vehicles, and will be shown and described herein with reference thereto. However, it is to be appreciated that the subject matter of the present disclosure is also amenable to use in other applications and environments, and that the specific uses shown and described herein are merely exemplary. For example, the subject matter of the present disclosure could be used in connection with gas spring assemblies of non-wheeled vehicles, support structures, height adjusting systems and actuators associated with industrial machinery, components thereof and/or other such equipment. Accordingly, the subject matter of the present disclosure is not intended to be limited to use associated with gas spring suspension systems of wheeled vehicles.

Wheeled motor vehicles of most types and kinds include a sprung mass, such as a body or chassis, for example, and an unsprung mass, such as two or more axles or other wheel-engaging members, for example, with a suspension system disposed therebetween. Typically, a suspension system will include a plurality of spring devices as well as a plurality of damping devices that together permit the sprung and unsprung masses of the vehicle to move in a somewhat controlled manner relative to one another. Movement of the sprung and unsprung masses toward one another is normally referred to in the art as jounce motion while movement of the sprung and unsprung masses away from one another is commonly referred to in the art as rebound motion.

Vehicle suspension systems of a wide variety of types and kinds have been developed and are commonly used. Components of such vehicle suspension systems are often secured between opposing structural members that move relative to one another during travel between jounce and rebound conditions. In many applications and uses associated with wheeled motor vehicles, the suspension system of the vehicle is adapted and arranged such that there are substantially no operating conditions, during normal usage, under which the plurality of spring devices would be tensioned or otherwise undergo a tension load. That is, the configuration and/or use of conventional suspension systems is such that the spring devices are not tensioned under during rebound motion and are generally used in compression under normal operating conditions.

In some cases, the spring devices can take the form of gas spring assemblies that utilize pressurized gas as the working medium. Gas spring assemblies of various types, kinds and constructions are well known and commonly used. Typical gas spring assemblies can include a flexible wall that is secured between comparatively rigid end members. A wide variety of arrangements for securing the flexible wall on or along an end member have been developed, and it is recognized that different securing arrangements have different advantages, such as low cost, improved sealing or reliability, high strength and/or a capability of disassembly and/or repair, for example. Thus, different securing arrangements may be employed in different applications depending upon the particular conditions under which the gas spring assembly is intended for use, such as applications during which elevated internal gas pressures, over-extension conditions and/or exposure to low temperatures may be experienced. In many cases, a different securing arrangement may be selected and used on each of the two different end members of a gas spring assembly.

One example of a construction that is commonly used includes a component that is typically referred to in the art as an end closure that is permanently (i.e., inseparable without damage, destruction or material alteration of at least one of the component parts) secured to an end of a flexible spring member. In many cases, the permanent connection is formed during a vulcanization or curing process by which an end of a flexible spring member that is at least partially formed from an uncured elastomeric material (e.g., rubber) is vulcanized or otherwise cured and thereby permanently adhered to the end closure, which is typically received within an open end of the flexible spring member.

While a robust and substantially fluid-tight connection can be created between the flexible spring member and the end closure using the aforementioned processes, it has been recognized that such vulcanization and/or other curing processes also include numerous disadvantages or other opportunities for improvement. For example, conventional constructions and the corresponding processes normally include added curing time to allow the end closure to be heated to the curing temperature. As another example, permanently-attached constructions and the corresponding processes often utilize an adhesive compound that is applied between the end of the flexible spring member and the end closure. The application of such an adhesive compound can add material and labor costs to the construction. As a further example, certain applications and/or conditions of use may benefit from the use of an end closure having improved corrosion resistance. Typically, conventional, permanently-attached constructions avoid the use of corrosion resistant coatings on the end closures as discontinuities in the coating can be generated due to clamping during the curing processes. Additionally, some coatings can interfere with or otherwise disadvantageously affect the vulcanization and/or other curing process and resulting permanent connection between the flexible spring member and the end closure.

Notwithstanding the common use and overall success of known gas spring constructions, it is believed desirable to develop constructions for gas spring assemblies and/or components thereof that are capable of providing improved retention and/or securement of the flexible wall, improved performance or other characteristics, and/or overcoming the foregoing and/or other disadvantages of known constructions, while promoting relatively low costs of manufacture, ease of assembly and/or otherwise advancing the art of gas spring devices.

BRIEF SUMMARY

One example of an end closure in accordance with the subject matter of the present disclosure can be dimensioned to receivingly engage an end of an associated flexible spring member. The associated flexible spring member can be at least partially formed from an elastomeric material that is in a substantially cured condition. The end closure can have a longitudinal axis and can include an end closure wall. The end closure wall can include one or more wall portions and can terminate at a distal edge. The end closure wall can include a base wall portion disposed transverse to the longitudinal axis. An outer side wall portion can extend from along the base wall portion and an inner side wall portion can be spaced from the outer side wall portion in a direction opposite the base wall portion. The outer side wall portion can have a cross-sectional dimension and the inner side wall portion can have a cross-sectional dimension that is less than the cross-sectional dimension of the outer side wall portion. A shoulder wall portion can be disposed between the inner and outer side wall portions and a shoulder wall portion can be disposed between the inner side wall portion and the distal edge such that the shoulder wall portions are spaced apart from one another. An outer surface of the inner side wall portion and at least one shoulder surface formed by at least one of the shoulder wall portions can together at least partially form a mounting region dimensioned to receive the end of the associated flexible spring member such that a substantially fluid-tight seal can be formed therewith. In some cases, a non-permanent connection can be formed between the end closure and the end of the associated flexible spring member upon relative displacement in an axial direction toward one another to form a radially-resilient (e.g., snap-fit) engagement between the end closure and the end of the associated flexible spring member.

One example of a gas spring assembly in accordance with the subject matter of the present disclosure can include a flexible spring member having a longitudinal axis. The flexible spring member can be at least partially formed from an elastomeric material in a substantially cured condition that extends peripherally about the longitudinal axis and lengthwise between opposing first and second ends to at least partially define a spring chamber. An end member can be secured across the first end of the flexible spring member such that a substantially fluid-tight seal is formed therewith. An end closure can be received within the second end of the flexible spring member such that a substantially fluid-tight, friction-fit (e.g., non-permanent, snap-over type) connection is formed between the end closure and the flexible spring member. An end member can be disposed in spaced relation to the end member secured to the first end of the flexible spring member, and can be dimensioned to abuttingly engage at least one of the end closure and the end of the flexible spring member connected thereto. At least the end closure can be attached to or otherwise secured along the end member. Preferably, such a substantially fluid-tight, friction-fit connection can include a radially-resilient (e.g., snap-fit) engagement generated as a result of relative displacement of the end closure and the second end of the flexible spring member in an axial direction toward one another.

One example of a suspension system in accordance with the subject matter of the present disclosure can include a pressurized gas system that includes a pressurized gas source and a control device. The suspension system can also include at least one gas spring assembly according to the foregoing paragraph. The at least one gas sprig assembly can be disposed in fluid communication with the pressurized gas source through the control device such that pressurized gas can be selectively transferred into and out of the spring chamber.

One example of a method of assembling a gas spring assembly in accordance with the subject matter of the present disclosure can include providing a flexible spring member having a longitudinal axis and extending peripherally about the longitudinal axis between opposing first and second ends. The flexible spring member can be at least partially formed from an elastomeric material in a substantially cured condition. The method can also include providing an end closure including a side wall portion that is dimensioned to receivingly engage a first end of the flexible spring member. The method can further include displacing the first end of the flexible spring member (in a substantially cured condition) and the end closure relative to one another such that the first end is received along the side wall portion and such that a substantially fluid-tight, friction-fit connection is formed therebetween. The method can also include providing a first end member and securing the first end of the flexible spring member and the end closure in abutting engagement along the first end member. The method can further include providing a second end member and securing the second end member across the second end of the flexible spring member.

Another example of a method of assembling a gas spring assembly in accordance with the subject matter of the present disclosure can include providing a flexible spring member having a longitudinal axis and extending peripherally about the longitudinal axis between opposing first and second ends. The flexible spring member can be at least partially formed from an elastomeric material in a substantially cured condition. The method can also include providing an end closure including a side wall portion that is dimensioned to receive a first end of the flexible spring member. The method can further include providing a first end member and securing the end closure on or along the first end member. The method can also displacing the first end of the flexible spring member and at least the end closure relative to one another such that the first end is received along the side wall portion and such that a substantially fluid-tight, friction-fit connection is formed therebetween. The method can further include providing a second end member and securing the second end member across the second end of the flexible spring member.

DETAILED DESCRIPTION

Turning now to the drawings, it is to be understood that the showings are for purposes of illustrating examples of the subject matter of the present disclosure and are not intended to be limiting. Additionally, it will be appreciated that the drawings are not to scale and that portions of certain features and/or elements may be exaggerated for purposes of clarity and/or ease of understanding.

Figure 1:
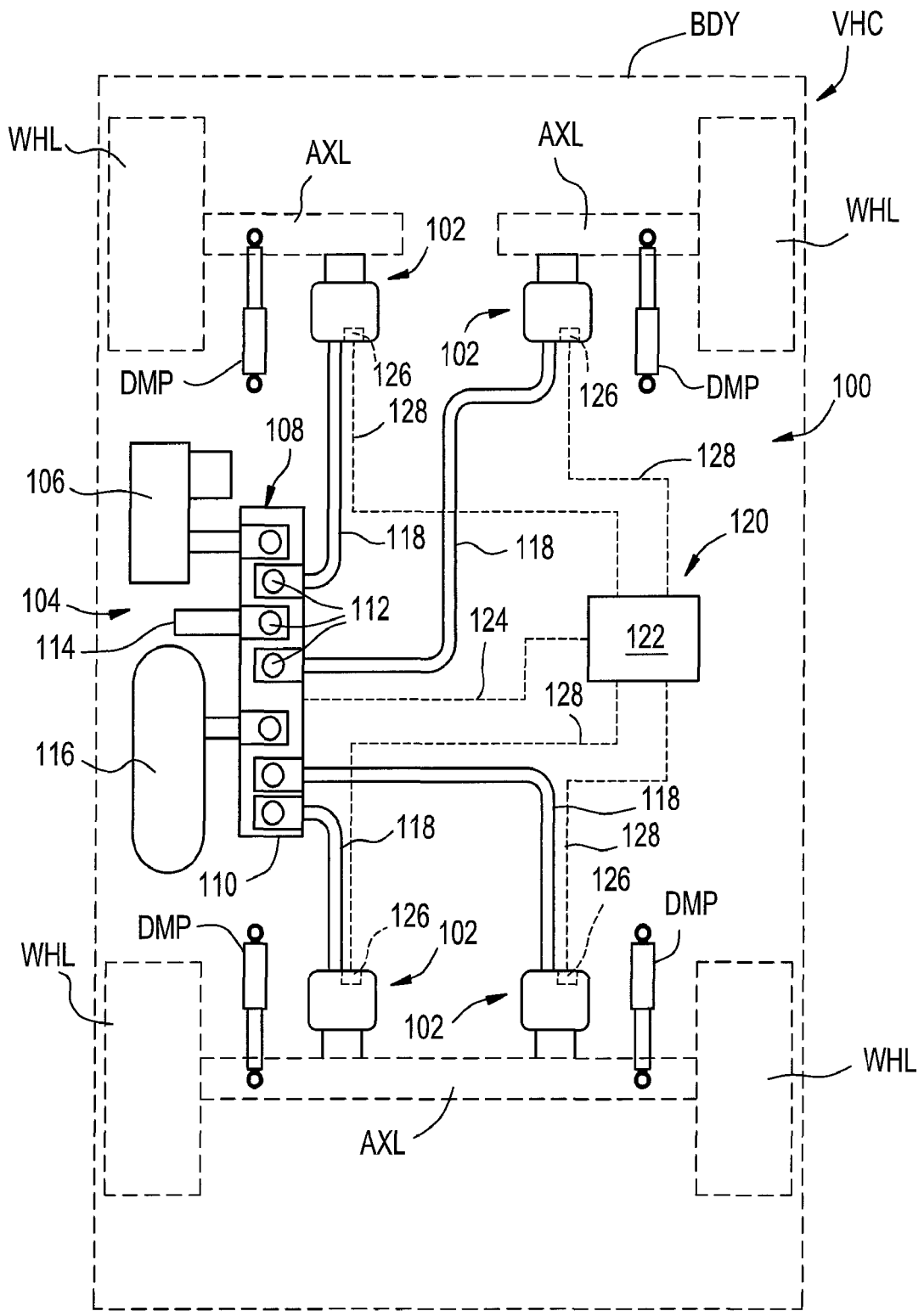
FIG. 1 is a schematic representation of one example of a suspension system that includes a plurality of gas spring assemblies in accordance with the subject matter of the present disclosure.

FIG. 1 illustrates one example of a suspension system 100 disposed between a sprung mass, such as an associated vehicle body BDY, for example, and an unsprung mass, such as an associated wheel WHL or an associated axle AXL, for example, of an associated vehicle VHC. It will be appreciated that any one or more of the components of the suspension system can be operatively connected between the sprung and unsprung masses of the associated vehicle in any suitable manner. Additionally, it will be appreciated that such a suspension system of the vehicle can, optionally, include a plurality of damping members, such as dampers DMP, for example, and that any such damping members can also be operatively connected between the sprung and unsprung masses of the associated vehicle in any suitable manner.

The suspension system can also include a plurality of gas spring assemblies supported between the sprung and unsprung masses of the associated vehicle. In the arrangement shown in FIG. 1, suspension system 100 includes four gas spring assemblies 102, one of which is disposed toward each corner of the associated vehicle adjacent a corresponding wheel WHL. However, it will be appreciated that any other suitable number of gas spring assemblies could alternately be used in any other configuration or arrangement. As shown in FIG. 1, gas spring assemblies 102 are supported between axles AXL and body BDY of associated vehicle VHC. Additionally, it will be recognized that the gas spring assemblies shown and described in FIG. 1 (e.g., gas spring assemblies 102) are illustrated as being of a rolling lobe-type construction. It is to be understood, however, that gas spring assemblies of other types, kinds and/or constructions could alternately be used.

Suspension system 100 also includes a pressurized gas system 104 operatively associated with the gas spring assemblies for selectively supplying pressurized gas (e.g., air) thereto and selectively transferring pressurized gas therefrom. In the exemplary embodiment shown in FIG. 1, pressurized gas system 104 includes a pressurized gas source, such as a compressor 106, for example, for generating pressurized air or other gases. A control device, such as a valve assembly 108, for example, is shown as being in communication with compressor 106 and can be of any suitable configuration or arrangement. In the exemplary embodiment shown, valve assembly 108 includes a valve block 110 with a plurality of valves 112 supported thereon. Valve assembly 108 can also optionally include a suitable exhaust, such as a muffler 114, for example, for venting pressurized gas from the system. Optionally, pressurized gas system 104 can also include a reservoir 116 in fluid communication with the compressor and/or valve assembly 108 and suitable for storing pressurized gas, such as storing pressurized gas at a pressure level greater than atmospheric pressure for an extended period of time (e.g., minutes, hours, days, weeks or months).

Valve assembly 108 can be in fluid communication with gas spring assemblies 102 in any suitable manner, such as through suitable gas transfer lines 118, for example. As such, pressurized gas can be selectively transferred into and/or out of the gas spring assemblies through valve assembly 108 by selectively operating valves 112, such as to alter or maintain vehicle height at one or more corners of the vehicle, for example.

Suspension system 100 can also include a control system 120 that is capable of communication with any one or more systems and/or components (not shown) of vehicle VHC and/or suspension system 100, such as for selective operation and/or control thereof. Control system 120 can include a controller or electronic control unit (ECU) 122 communicatively coupled with compressor 106 and/or valve assembly 108, such as through a conductor or lead 124, for example, for selective operation and control thereof, which can include supplying and exhausting pressurized gas to and/or from gas spring assemblies 102. Controller 122 can be of any suitable type, kind and/or configuration.

Control system 120 can also, optionally, include one or more height (or distance) sensing devices 126, such as, for example, may be operatively associated with the gas spring assemblies and capable of outputting or otherwise generating data, signals and/or other communications having a relation to a height of the gas spring assemblies or a distance between other components of the vehicle. Height sensing devices 126 can be in communication with ECU 122, which can receive the height or distance signals therefrom. The height sensing devices can be in communication with ECU 122 in any suitable manner, such as through conductors or leads 128, for example. Additionally, it will be appreciated that the height sensing devices can be of any suitable type, kind and/or construction.

One example of a gas spring assembly 200 in accordance with the subject matter of the present disclosure, such as may be suitable for use as one of gas spring assemblies 102 in FIG. 1, for example, is shown in FIGS. 2-5 as having a longitudinally-extending axis AX (FIG. 3) and can include one or more end members, such as, for example, an end member 202 and an end member 204 that is spaced longitudinally from end member 202. A flexible spring member 206 can extend peripherally around axis AX and can be secured between the end members in a substantially fluid-tight manner such that a spring chamber 208 (FIG. 3) is at least partially defined therebetween.

Gas spring assembly 200 can be disposed between associated sprung and unsprung masses of an associated vehicle in any suitable manner. For example, one end member can be operatively connected to the associated sprung mass with the other end member disposed toward and operatively connected to the associated unsprung mass. In the embodiment shown in FIGS. 2 and 3, for example, end member 202 is secured along a first or upper structural component USC, such as associated vehicle body BDY in FIG. 1, for example, and can be secured thereon in any suitable manner. For example, one or more securement devices, such as mounting studs 210, for example, can be included along end member 202. In some cases, the one or more securement devices (e.g., mounting studs 210) can project outwardly from end member 202 and can be secured thereon in a suitable manner, such as, for example, by way of a flowed-material joint (not shown) or a press-fit connection (not identified). Additionally, such one or more securement devices can extend through mounting holes HLS in upper structural component USC and receive one or more threaded nuts 212 or other securement devices, for example. As an alternative to one or more of mounting studs 210, one or more threaded passages (e.g., blind passages and/or through passages) could be used in conjunction with a corresponding number of one or more threaded fasteners.

Additionally, a fluid communication port, such as a transfer passage 214 (FIG. 3), for example, can optionally be provided to permit fluid communication with spring chamber 208, such as may be used for transferring pressurized gas into and/or out of the spring chamber, for example. In the exemplary embodiment shown, transfer passage 214 extends through at least one of mounting studs 210 and is in fluid communication with spring chamber 208. It will be appreciated, however, that any other suitable fluid communication arrangement could alternately be used.

End member 204 can be secured along a second or lower structural component LSC, such as an axle AXL in FIG. 1, for example, in any suitable manner. As one example, lower structural component LSC could include one or more mounting holes HLS extending therethrough. In such case, a mounting stud 216 could be operatively connected to end member 204 and/or another component of the gas spring assembly, and could extend through one of mounting holes HLS, such as to receive a corresponding threaded nut 218, for example.

It will be appreciated that the one or more end members can be of any suitable type, kind, construction and/or configuration, and can be operatively connected or otherwise secured to the flexible wall in any suitable manner. In the exemplary arrangement shown in FIGS. 2 and 3, for example, end member 202 is of a type commonly referred to as a bead plate that is secured to a first end 220 of flexible spring member 206, such as by crimping or otherwise deforming an outer peripheral portion 222 of end member 202 to form a substantially fluid-tight, crimped-edge connection with end 220 of flexible spring member 206.

End member 204 is shown in the exemplary arrangement in FIGS. 2-5 as being of a type commonly referred to as a piston (or a roll-off piston) that has an outer surface 224 that abuttingly engages flexible spring member 206 such that a rolling lobe 226 is formed therealong. As gas spring assembly 200 is displaced between extended and collapsed conditions, rolling lobe 226 can be displaced along outer surface 224 in a conventional manner.

Figure 2:
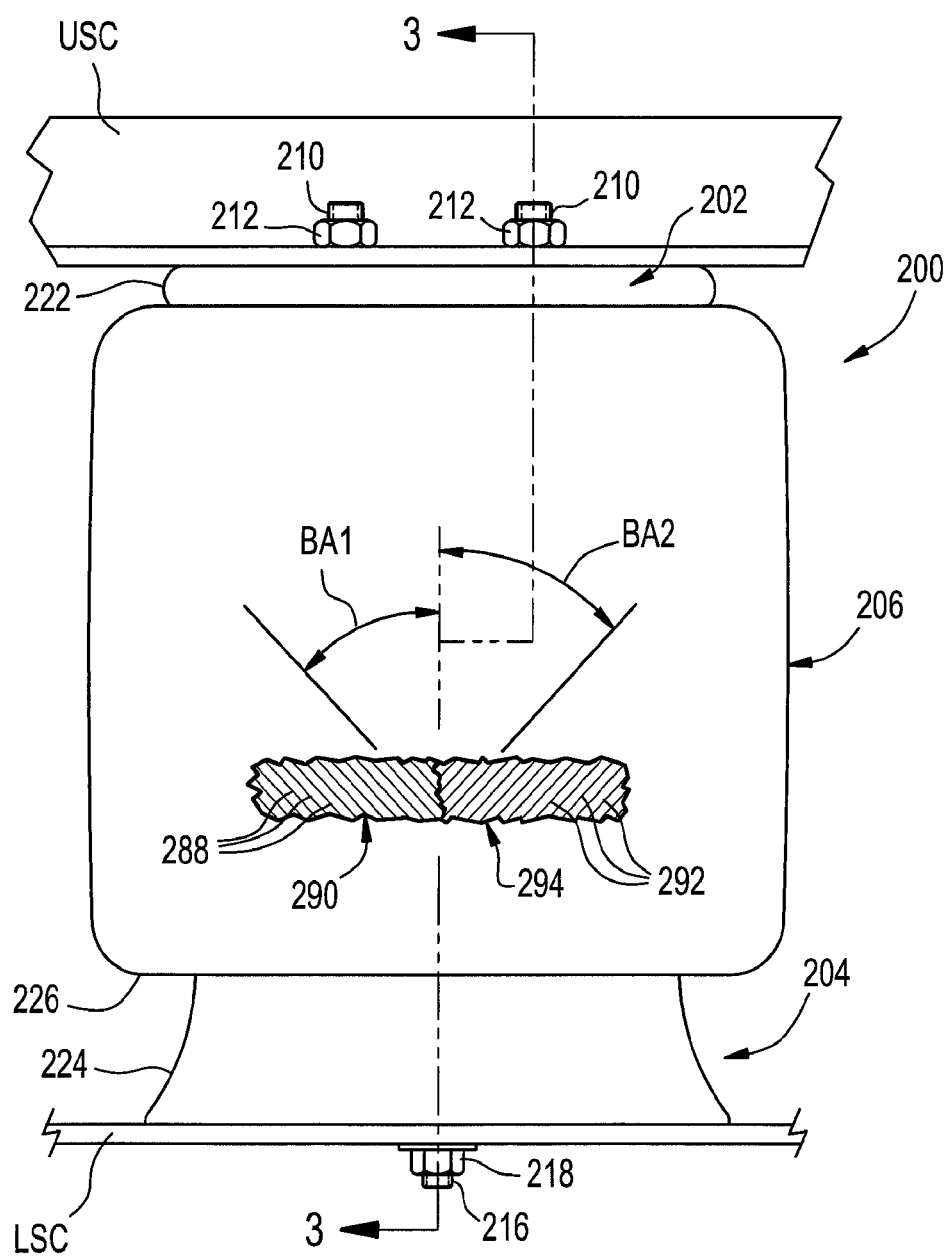
FIG. 2 is a side elevation view of one example of a gas spring assembly in accordance with the subject matter of the present disclosure.
Figure 3:
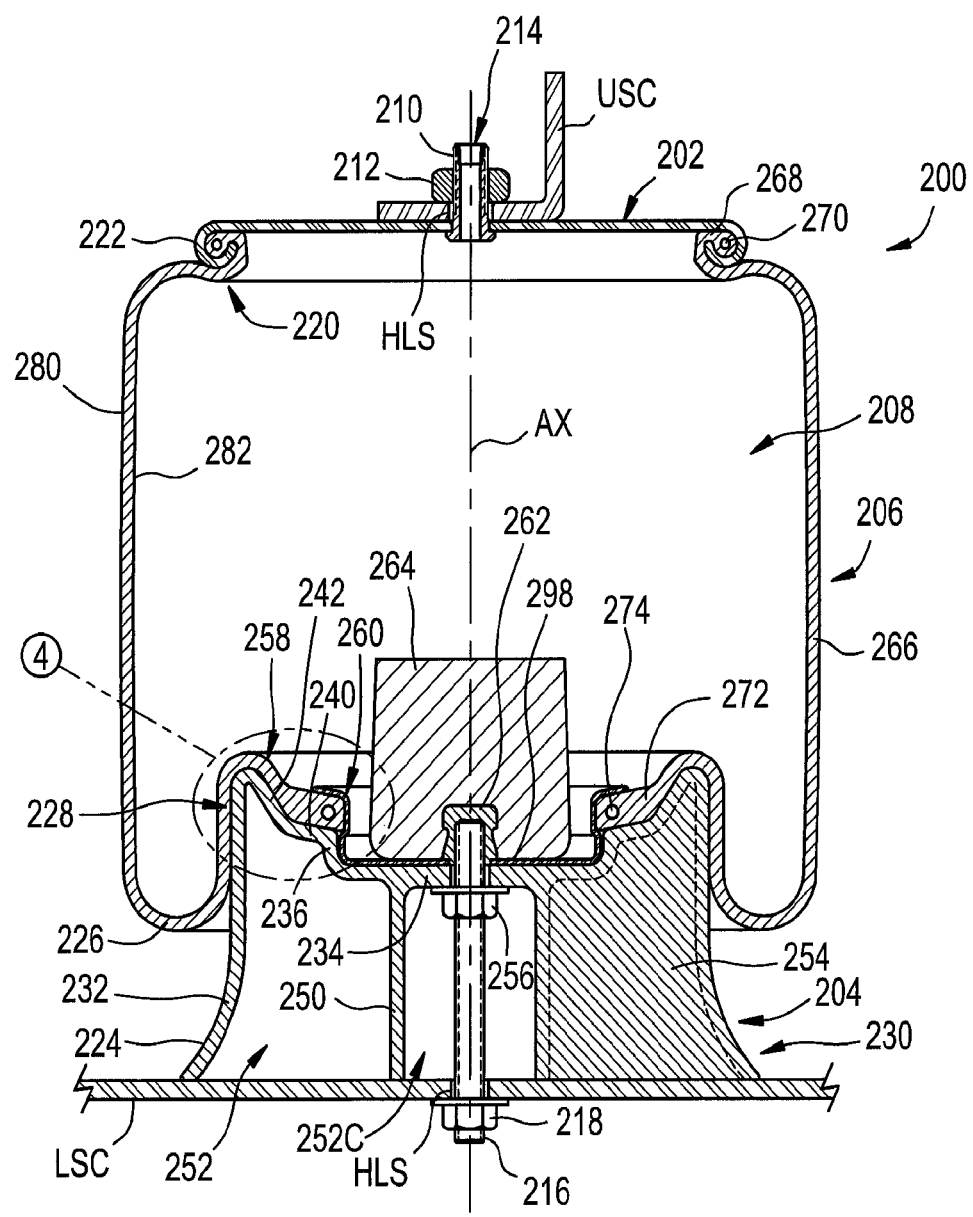
FIG. 3 is a cross-sectional side view of the gas spring assembly shown in FIG. 2 taken from along line 3-3 therein illustrating an end member, a flexible spring member and an end closure in accordance with the subject matter of the present disclosure.

As identified in FIG. 3, end member 204 extends generally between a first or upper end 228 and a second or lower end 230. End member 204 can be formed from any suitable material or combination of materials, and can include any suitable number of one or more components. For example, the end member could be formed from two or more metal parts that are secured together, such as by way of one or more securement devices and/or flowed-material joints, for example. As another example, end member 204 could be at least partially formed from a polymeric material, and can, optionally and in some cases, be molded or otherwise formed as a single, unitary body that includes one or more walls and/or wall portions. In the arrangement in FIGS. 2-5, for example, end member 204 is shown as including an outer side wall (or side wall portion) 232 that extends peripherally about axis AX and generally longitudinally between ends 228 and 230. Outer side wall portion 232 can at least partially define or otherwise include at least a portion of outer surface 224.

End member 204 can also include a base wall (or wall portion) 234 that extends generally transverse to axis AX and can at least partially form a closed end of the end member. Base wall portion 234 can include an inner edge (not numbered) that at least partially defines a hole or opening (not numbered) that can be dimensioned to permit a securement device, such as mounting stud 216, for example, to extend therethrough. In some cases, base wall portion 234 can be directly connected to or otherwise extend directly from the outer side wall portion. In other cases, end member 204 can include one or more walls or wall portions disposed between and operatively connecting the outer side wall portion and the base wall portion. For example, end member 204 can include an inner side wall portion 236 that extends in a generally axial direction from along base wall portion 234. Together with the base wall portion, the inner side wall portion can at least partially define a recess 238 extending into end member 204 and dimensioned to receive at least a portion of an associated end closure, such as will be described in detail hereinafter.

As another example, end member 204 can include end walls (or end wall portions) 240 and/or 242 that extend between inner and outer side wall portions 236 and 232. In the arrangement shown in FIGS. 3-5, end wall portions 240 and 242 have a generally linear cross-sectional shape and are disposed at different acute angles relative to axis AX such that the end of wall portions respectively form end surfaces 244 and 246 that have different frustoconical shapes. It will be appreciated, however, that wall portions having other cross-sectional shapes and/or configurations could alternately be used. As a further example, end member 204 can include a shoulder wall (or shoulder wall portion) 248 that has a curved cross-sectional shape and transitions between outer side wall portion 232 and one or more of end wall portion 242, end wall portion 240, inner side wall portion 236 and/or base wall portion 234.

In some cases, end member 204 can include one or more additional walls or wall portions, such as may provide added structure, support and/or rigidity to the end member. For example, end member 204 can include a central support wall (or wall portion) 250 extending peripherally about axis AX and axially from along base wall portion 234 in a direction toward end 230. End member 204 can include an outer cavity 252 formed between outer side wall portion 232 and central support wall portion 250 that extends into the end member from along end 230. End member 204 can also, optionally, include a plurality of support walls (or support wall portions) 254 disposed in peripherally-spaced relation to one another about axis AX. The plurality of support walls can separate outer cavity 252 into a plurality of chambers (not shown). End member 204 can also include a central cavity 252C that is at least partially defined by central support wall 250 and can be dimensioned to receive one or more securement features, such as mounting stud 216 and/or a threaded nut 256 received therealong, for example.

Figure 4:
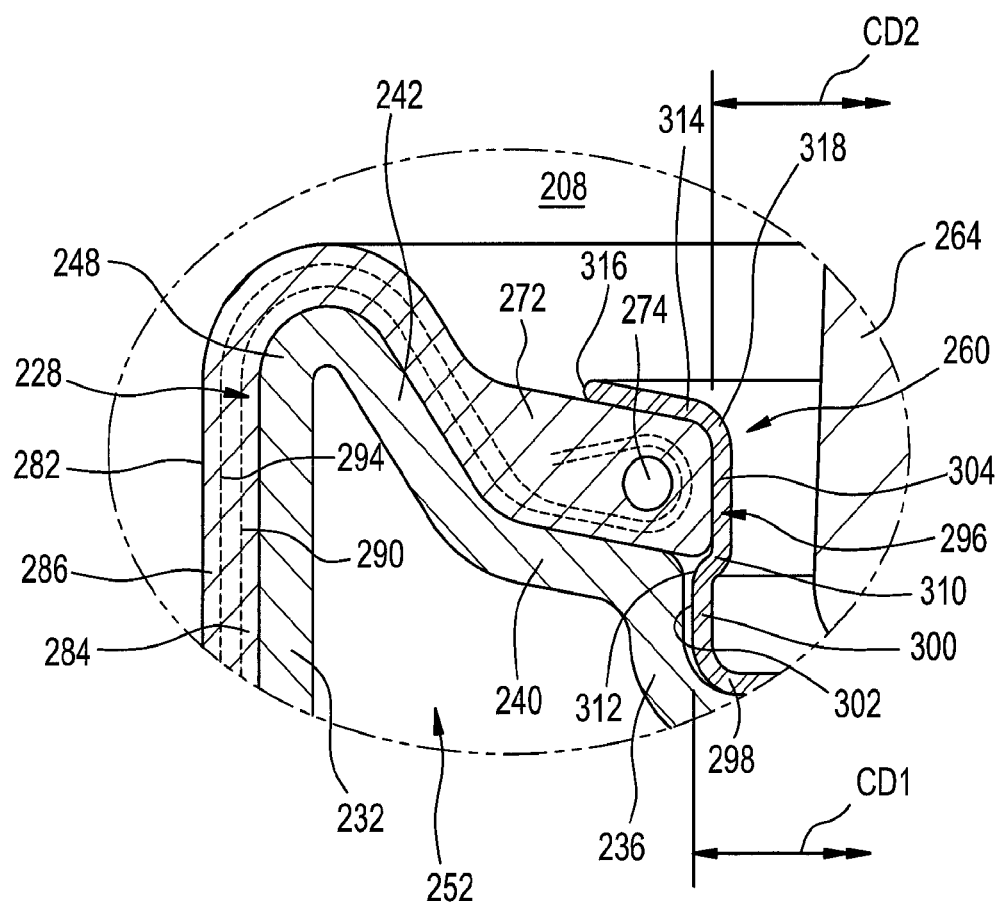
FIG. 4 is an enlarged, cross-sectional view of a portion of the gas spring assembly in FIGS. 2 and 3 identified as Detail 4 in FIG. 3.
Figure 5:
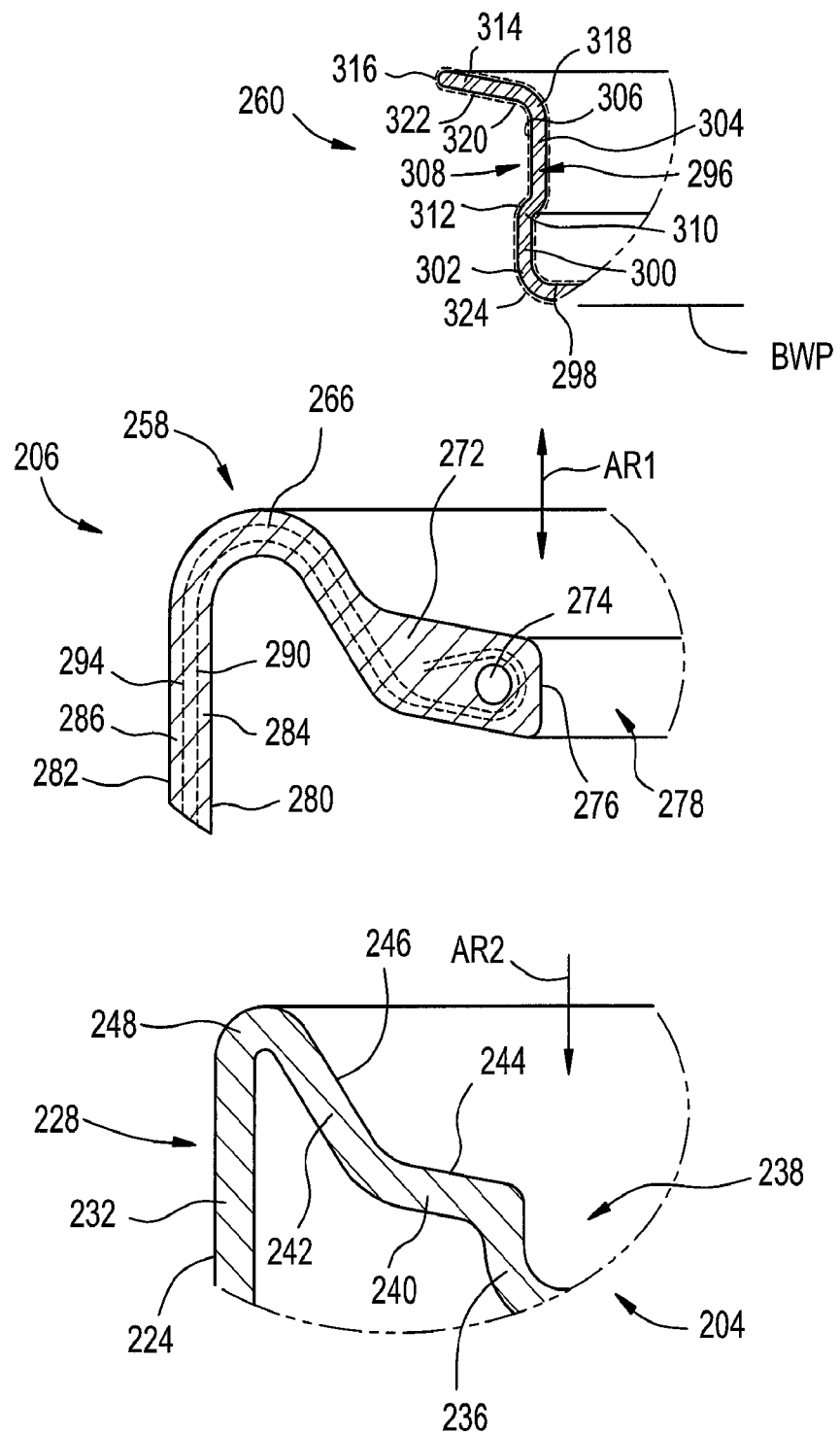
FIG. 5 is an exploded, cross-sectional side view of the portion of the gas spring assembly shown in FIG. 4.

One example of a connection between the flexible spring member and the end member in accordance with the subject matter of the present disclosure is shown in FIGS. 3-5 as including a second end 258 of flexible spring member 206 being secured on or along upper end 228 of end member 204 using an end closure 260. The end closure can be secured on or along end member 204 in any suitable manner. In the exemplary embodiment shown, a retaining nut 262 is threadably secured on mounting stud 216 and engages end closure 260. By securing mounting stud 216 on end member 204, such as by using threaded nut 256, for example, the end closure can be drawn tight to upper end 228 to thereby secure end closure 260 on or along end member 204. It is to be understood, however, that the arrangement shown and described is merely exemplary and that any other suitable construction and/or configuration can alternately be used.

In some cases, a jounce bumper 264 can, optionally, be supported within spring chamber 208, such as to inhibit direct contact between end members 202 and 204, for example. It will be appreciated that the jounce bumper, if included, can be supported on or along an end member in any suitable manner. For example, jounce bumper 264 is shown as being received on and retained by retaining nut 262.

Flexible spring member 206 can include a flexible wall 266 that can extend between first and second ends 220 and 258. As discussed above, it will be appreciated that end members 202 and 204 can be operatively connected to first and second ends 220 and 258 in any suitable manner. As such, flexible spring member 206 and flexible wall 266 thereof can include any suitable combination of one or more features on or along the first and/or second ends that may be suitable for facilitating such operative connections. As one example, flexible spring member 206 can include a mounting bead 268 disposed along end 220. Mounting bead 268 can extend peripherally around end 220 and can, optionally, include a bead reinforcement element 270, such as an endless, annular wire, for example. During assembly, outer peripheral portion 222 of the end member can be controllably deformed (e.g., crimped, swaged, pressed) into abutting engagement with flexible wall 206 such that mounting bead 268 is at least partially captured by the outer peripheral portion to form a crimped-edge connection with end member 202.

As another example, flexible spring member 206 can include a mounting bead 272 disposed along end 258. Mounting bead 272 can extend peripherally around end 258 and can, optionally, include a bead reinforcement element 274, such as an endless, annular wire, for example. In a preferred arrangement, flexible spring member 206 includes an inner end surface 276 (FIG. 5) that at least partially defines an opening 278 (FIG. 5) along end 258. Inner end surface 276 and opening 278 are preferably dimensioned to receivingly engage a surface, wall and/or wall portion of end closure 260 such that a substantially fluid-tight, friction-fit connection can be formed with the end closure. During assembly, end 258 of flexible spring member 206 and end closure 260 can be displaced relative to one another (e.g., in an axial direction toward one another) such that inner end surface 276 slides along one or more surfaces of end closure 260 and into position along a mounting region of the end closure, such as, for example, may be defined by one or more surfaces, walls and/or wall portions thereof.

It will be appreciated that flexible spring member 206 and flexible wall 266 thereof can be formed in any suitable manner and from any suitable material or combination of materials, such as by using one or more fabric-reinforced, elastomeric plies or layers and/or one or more un-reinforced, elastomeric plies or layers, for example. Typically, one or more fabric-reinforced, elastomeric plies and one or more un-reinforced, elastomeric plies will be used together and formed from a common elastomeric material, such as a synthetic rubber, a natural rubber or a thermoplastic elastomer. In other cases, however, a combination of two or more different materials, two or more compounds of similar materials, or two or more grades of the same material could be used.

As shown in FIGS. 3-5, for example, flexible wall 266 can include an outer surface 280 and an inner surface 282, which can at least partially define spring chamber 208. Additionally, as identified in FIG. 4, flexible wall 266 can include an outer or cover ply 284 that at least partially forms outer surface 280, an inner or liner ply 286 that at least partially forms inner surface 282. In a preferred arrangement, flexible wall 266 can also include one or more reinforcing plies disposed between outer and inner surfaces 280 and 282. The one or more reinforcing plies can be of any suitable construction and/or configuration. For example, the one or more reinforcing plies can include one or more lengths of filament material that are at least partially embedded therein. It will be appreciated that the one or more lengths of filament material can be of any suitable type, kind and/or construction, such as monofilament polymeric strands, braided cotton yarn or bundled carbon fibers, for example. Furthermore, such one or more lengths of filament material could optionally be coated or otherwise treated, such as, for example, to improve adhesion with the adjacent plies or other surrounding material. For example, the filament material could be rubber coated, such that upon applying a layer of rubber over the filament material improved adhesion between the various layers could result during and/or after vulcanization, for example.

Additionally, it will be appreciated that the one or more lengths of filament material, if provided, can be oriented in any suitable manner. As one example, flexible wall 266 is shown in FIGS. 2, 4 and 5 as including a plurality of filament segments 288 of one reinforcing ply 290 disposed at one bias angle BA1 (FIG. 2) and a plurality of filament segments 292 of another reinforcing ply 294 disposed another bias angle BA2 (FIG. 2). It will be appreciated that any suitable bias angles can be used, such as bias angles within a range of from approximately 3 degrees to approximately 87 degrees, for example. In some cases, the filament segments can be disposed at approximately the same bias angle but oriented in the opposing direction, such as is represented in FIG. 2 by reference dimensions BA1 and BA2, for example.

Gas spring assembly 200 differs from conventional constructions at least in that flexible wall 266 of flexible spring member 206 is in a substantially-cured condition prior to assembly with end closure 260. As such, second end 258 of flexible spring member 206 is secured on or along end closure 260 by way of a substantially fluid-tight, friction-fit (i.e., separable, re-usable or otherwise non-permanent) connection rather than by way of permanent (i.e., inseparable without damage, destruction or material alteration of at least one of the component parts) connection between the second end of the flexible spring member and the end closure. This permits the end of the flexible spring member and the end closure to be pressed or otherwise displaced relative to one another (e.g., in an axial direction toward one another) to form a snap-fit or otherwise radially-resilient connection during assembly. It will be appreciated that constructions in accordance with the subject matter of the present disclosure can include any suitable combination of features, elements and/or characteristics.

As one example, end closure 260 is shown in FIGS. 3-5 as including an end closure wall 296 that can be formed from any suitable material or combination of materials. In a preferred arrangement, end closure 260 and end closure wall 296 thereof are formed as a single, unitary component from a metal material, such as steel or aluminum, for example. It will be appreciated, however, that other configurations and/or constructions could alternately be used. End closure wall 296 includes a base wall (or base wall portion) 298 and one or more side walls (or side wall portions) that extend from the base wall portion and provide end closure 260 with a generally dish-shaped or cup-shaped configuration. Base wall portion 298 is disposed generally transverse to longitudinal axis AX and extends radially outward toward the one or more side wall portions. End closure wall 296 can include an inner edge (not numbered) that at least partially defines a hole or opening (not numbered) dimensioned to permit a securement device, such as mounting stud 216, for example, to extend therethrough. In some cases, a portion of retaining nut 262, such as an annular projection (not numbered), for example, can extend into the opening, such as to position and/or retain the retaining nut on or along end closure 260, for example.

Additionally, in the arrangement shown in FIGS. 3-5, end closure wall 296 can include an outer side wall (or outer side wall portion) 300 that extends from along base wall portion 298 and projects outward from a base wall plane BWP (FIG. 5) that is at least partially formed by the base wall portion, such as in a generally axial direction, for example. Outer side wall portion 300 includes an outer surface 302 (FIG. 5) and a cross-sectional dimension along the outer surface, as is represented by reference dimension CD1 in FIG. 4. End closure wall 296 also includes an inner side wall (or inner side wall portion) 304 that is disposed axially outward from outer side wall portion 300 in a direction opposite base wall portion 298. Inner side wall portion 304 can include an outer surface 306 (FIG. 5) and a cross-sectional dimension along the outer surface, as is represented by reference dimension CD2 in FIG. 4. In a preferred arrangement, cross-sectional dimension CD2 of inner side wall portion 304 is less than cross-sectional dimension CD1 of outer side wall portion 300 such that a mounting region or seat 308 (FIG. 5) can be at least partially defined by outer surface 306 of inner side wall portion 304.

End closure wall 296 can include a shoulder wall (or shoulder wall portion) 310 disposed between outer side wall portion 300 and inner side wall portion 304. Shoulder wall portion 310 can include a shoulder surface 312 that extends between and operatively connects outer surfaces 302 and 306 such that a substantially-continuous, contoured surface profile can be formed along the exterior of end closure wall 296. Additionally, end closure wall 296 can include a flange wall (or flange wall portion) 314 that extends from along the inner side wall portion 304 in a radially outward direction to a distal edge 316. End closure wall 296 can also include a shoulder wall (or shoulder wall portion) 318 disposed between inner side wall portion 304 and flange wall portion 314. Shoulder wall portion 318 can include a shoulder surface 320 that extends between and operatively connects outer surface 306 and a surface 322 of flange wall portion 316 such that a substantially-continuous, contoured surface profile can be formed along the exterior of end closure wall 296.

Prior to assembly, flexible spring member 206 can be provided in a substantially-cured condition separate and apart from end closure 266 and end member 204, such as is shown in FIG. 5, for example. During assembly, end closure 260 can be positioned within the interior of flexible spring member 206 adjacent end 258 thereof. The end closure and the end of the flexible spring member can be pressed or otherwise displaced relative to one another in a direction toward one another, such as is represented in FIG. 5 by arrow AR1. During such an action, inner end surface 276 and opening 278 formed along end 258 of the flexible spring member are stretched over (e.g., radially-resiliently displaced) and slide along outer surface 302 of outer side wall portion 300. In a preferred arrangement, such an action can continue until at least a portion of inner end surface 276 is disposed along outer surface 306 of inner side wall portion 304 and at least partially received within mounting seat 308. In a preferred arrangement, end 258 of flexible spring member 206 can be disposed in abutting engagement with surface 322 of flange wall portion 316. Additionally, or in the alternative, at least a portion of end 258 and/or inner end surface 276 can be disposed in abutting engagement with one or more of shoulder surfaces 312 and/or 320, such as may assist in retaining the end of the flexible spring member in position within mounting seat 308 and/or otherwise along inner side wall portion 304 of end closure 260.

Once end 258 is received along end closure 260 such that a substantially fluid-tight seal is formed therebetween, the end and the end closure can be positioned on or along end member 204, such as is represented in FIG. 5 by arrow AR2. Once positioned, the end closure and the end of the flexible spring member can be secured on or along the end member, such as through the use of mounting stud 216 and threaded nut 256, for example. It will be appreciated that such constructions can permit the end closure to include one or more additional features, elements and/or characteristics. For example, end closure 260 can include one or more coatings and/or layers formed along at least a portion of the exterior thereof, such as is represented in FIG. 5 by dashed line 324, for example. One non-limiting example of a suitable coating and/or layer can include a corrosion resistant coating.

Another example of a gas spring assembly 400 in accordance with the subject matter of the present disclosure, such as may be suitable for use as one of gas spring assemblies 102 in FIG. 1, for example, is shown in FIGS. 6-9 as having a longitudinally-extending axis AX (FIG. 7) and can include one or more end members, such as, for example, an end member 402 and an end member 404 that is spaced longitudinally from end member 402. A flexible spring member 406 can extend peripherally around axis AX and can be secured between the end members in a substantially fluid-tight manner such that a spring chamber 408 (FIG. 7) is at least partially defined therebetween.

Gas spring assembly 400 can be disposed between associated sprung and unsprung masses of an associated vehicle in any suitable manner. For example, one end member can be operatively connected to the associated sprung mass with the other end member disposed toward and operatively connected to the associated unsprung mass. In the embodiment shown in FIGS. 6 and 7, for example, end member 402 is secured along a first or upper structural component USC, such as associated vehicle body BDY in FIG. 1, for example, and can be secured thereon in any suitable manner. For example, one or more securement devices, such as mounting studs 410, for example, can be included along end member 402. In some cases, the one or more securement devices (e.g., mounting studs 410) can project outwardly from end member 402 and can be secured thereon in a suitable manner, such as, for example, by way of a flowed-material joint (not shown) or a press-fit connection (not identified). Additionally, such one or more securement devices can extend through mounting holes HLS in upper structural component USC and can receive one or more threaded nuts 412 or other securement devices, for example. As an alternative to one or more of mounting studs 410, one or more threaded passages (e.g., blind passages and/or through passages) could be used in conjunction with a corresponding number of one or more threaded fasteners.

Additionally, a fluid communication port, such as a transfer passage 414 (FIG. 7), for example, can optionally be provided to permit fluid communication with spring chamber 408, such as may be used for transferring pressurized gas into and/or out of the spring chamber, for example. In the exemplary embodiment shown, transfer passage 414 extends through at least one of mounting studs 410 and is in fluid communication with spring chamber 408. It will be appreciated, however, that any other suitable fluid communication arrangement could alternately be used.

End member 404 can be secured along a second or lower structural component LSC, such as an axle AXL in FIG. 1, for example, in any suitable manner. As one example, lower structural component LSC could include one or more mounting holes HLS extending therethrough. In such case, a mounting stud 416 could be operatively connected to end member 404 and/or another component of the gas spring assembly, and could extend through one of mounting holes HLS, such as to receive a corresponding threaded nut 418, for example.

It will be appreciated that the one or more end members can be of any suitable type, kind, construction and/or configuration, and can be operatively connected or otherwise secured to the flexible wall in any suitable manner. In the exemplary arrangement shown in FIGS. 6 and 7, for example, end member 402 is of a type commonly referred to as a bead plate that is secured to a first end 420 of flexible spring member 406, such as by crimping or otherwise deforming an outer peripheral portion 422 of end member 402 to form a substantially fluid-tight, crimped-edge connection with end 420 of flexible spring member 406.

End member 404 is shown in the exemplary arrangement in FIGS. 6-9 as being of a type commonly referred to as a piston (or a roll-off piston) that has an outer surface 424 that abuttingly engages flexible spring member 406 such that a rolling lobe 426 is formed therealong. As gas spring assembly 400 is displaced between extended and collapsed conditions, rolling lobe 426 can be displaced along outer surface 424 in a conventional manner.

Figure 6:
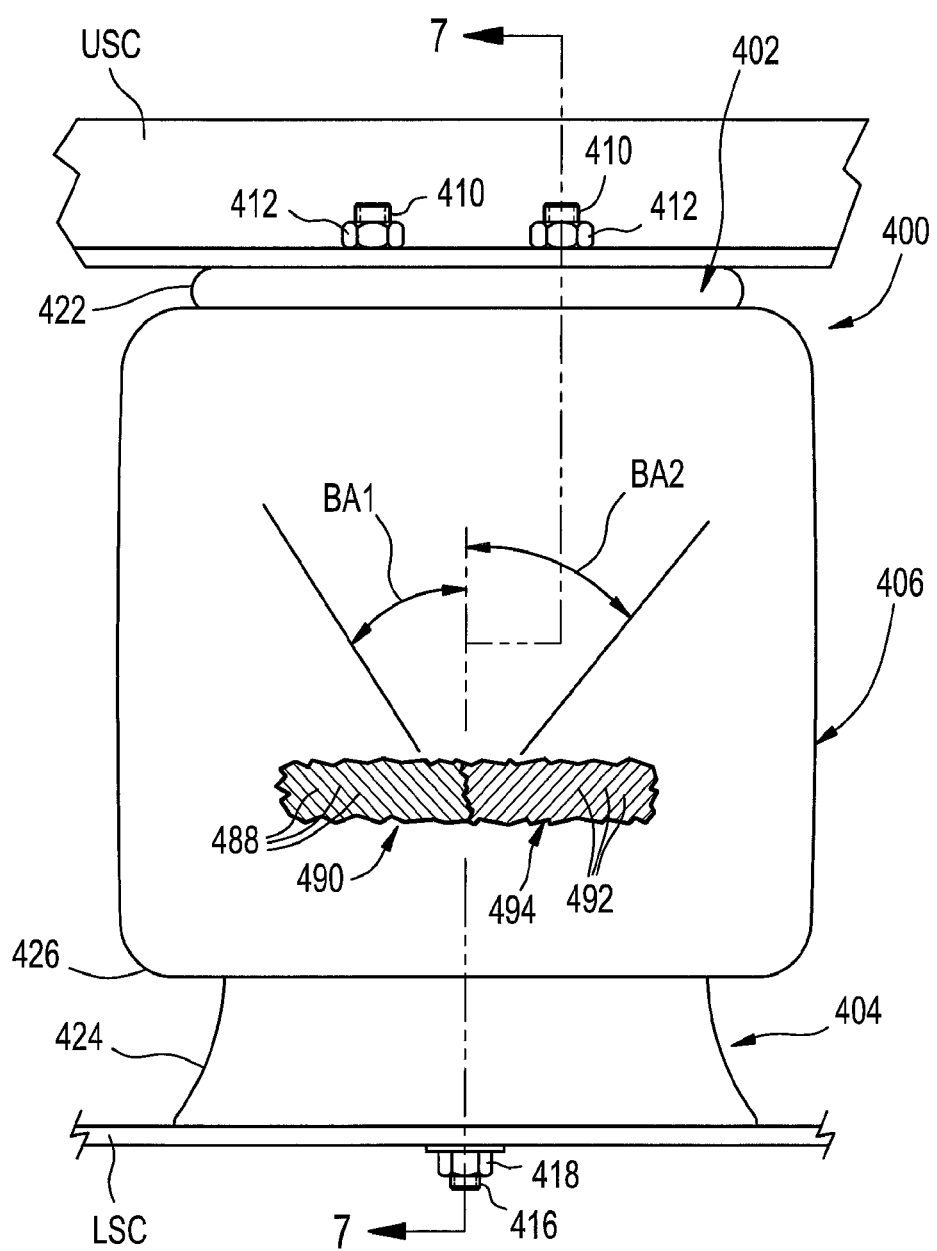
FIG. 6 is a side elevation view of another example of a gas spring assembly in accordance with the subject matter of the present disclosure.
Figure 7:
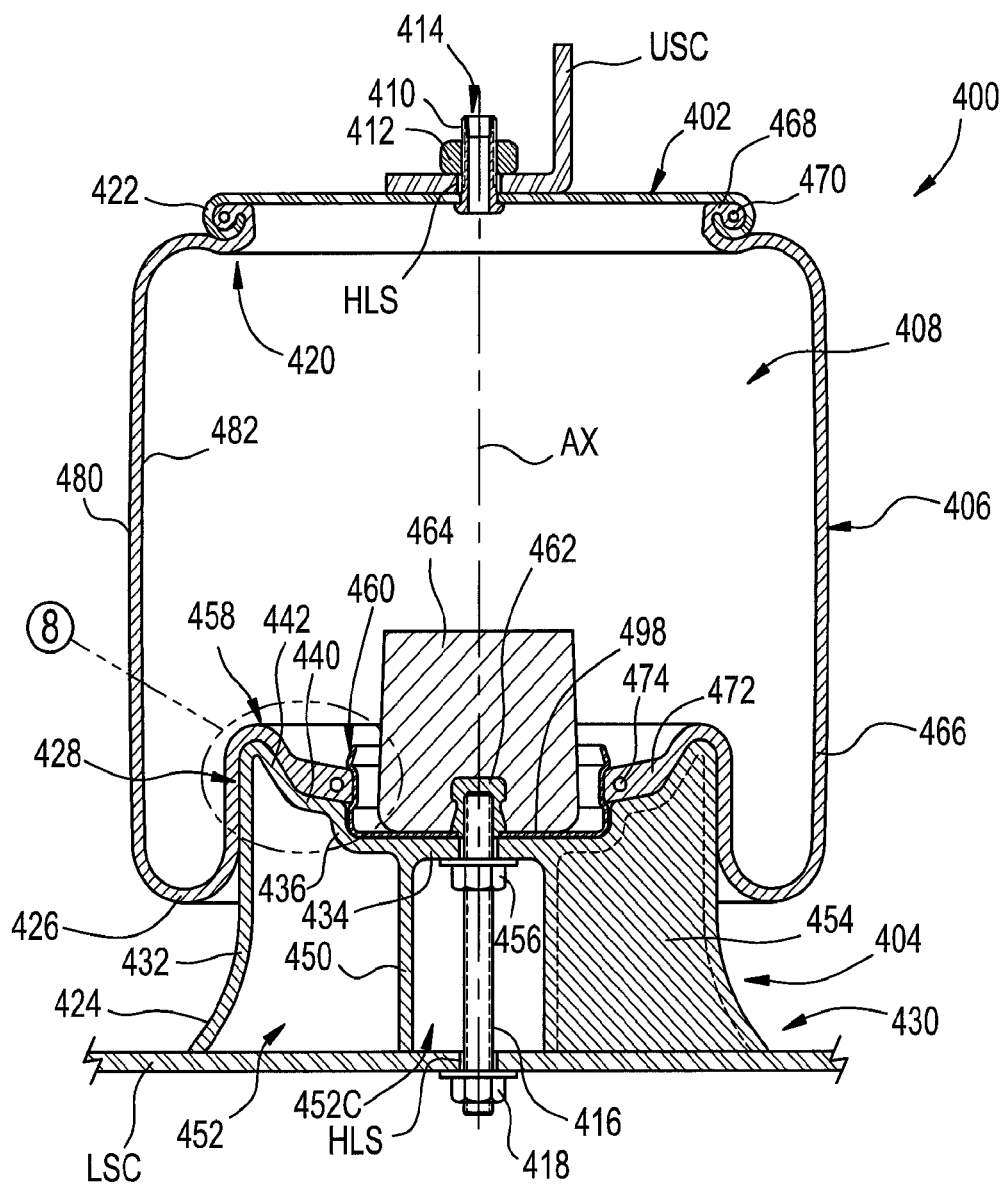
FIG. 7 is a cross-sectional side view of the gas spring assembly shown in FIG. 6 taken from along line 7-7 therein illustrating an end member, a flexible spring member and an end closure in accordance with the subject matter of the present disclosure.

As identified in FIG. 7, end member 404 extends generally between a first or upper end 428 and a second or lower end 430. End member 404 can be formed from any suitable material or combination of materials, and can include any suitable number of one or more components. For example, the end member could be formed from two or more metal parts that are secured together, such as by way of one or more securement devices and/or flowed-material joints, for example. As another example, end member 404 could be at least partially formed from a polymeric material, and can, optionally and in some cases, be molded or otherwise formed as a single, unitary body that includes one or more walls and/or wall portions. In the arrangement in FIGS. 6-9, for example, end member 404 is shown as including an outer side wall (or side wall portion) 432 that extends peripherally about axis AX and generally longitudinally between ends 428 and 430. Outer side wall portion 432 can at least partially define or otherwise include at least a portion of outer surface 424.

End member 404 can also include a base wall (or wall portion) 434 that extends generally transverse to axis AX and can at least partially form a closed end of the end member. Base wall portion 434 can include an inner edge (not numbered) that at least partially defines a hole or opening (not numbered) that can be dimensioned to permit a securement device, such as mounting stud 416, for example, to extend therethrough. In some cases, base wall portion 434 can be directly connected to or otherwise extend directly from the outer side wall portion. In other cases, end member 404 can include one or more walls or wall portions disposed between and operatively connecting the outer side wall portion and the base wall portion. For example, end member 404 can include an inner side wall portion 436 that extends in a generally axial direction from along base wall portion 434. Together with the base wall portion, the inner side wall portion can at least partially define a recess 438 extending into end member 404 and dimensioned to receive at least a portion of an associated end closure, such as will be described in detail hereinafter.

As another example, end member 404 can include end walls (or end wall portions) 440 and/or 442 that extend between inner and outer side wall portions 436 and 432. In the arrangement shown in FIGS. 7-9, end wall portions 440 and 442 have a generally linear cross-sectional shape and are disposed at different acute angles relative to axis AX such that the end wall portions respectively form end surfaces 444 and 446 that have different frustoconical shapes. It will be appreciated, however, that wall portions having other cross-sectional shapes and/or configurations could alternately be used. As a further example, end member 404 can include a shoulder wall (or shoulder wall portion) 448 that has a curved cross-sectional shape and transitions between outer side wall portion 432 and one or more of end wall portion 442, end wall portion 440, inner side wall portion 436 and/or base wall portion 434.

In some cases, end member 404 can include one or more additional walls or wall portions, such as may provide added structure, support and/or rigidity to the end member. For example, end member 404 can include a central support wall (or wall portion) 450 extending peripherally about axis AX and axially from along base wall portion 434 in a direction toward end 430. End member 404 can include an outer cavity 452 formed between outer side wall portion 432 and central support wall portion 450 that extends into the end member from along end 430. End member 404 can also, optionally, include a plurality of support walls (or support wall portions) 454 disposed in peripherally-spaced relation to one another about axis AX. The plurality of support walls can separate outer cavity 452 into a plurality of chambers (not shown). End member 404 can also include a central cavity 452C that is at least partially defined by central support wall 450 and can be dimensioned to receive one or more securement features, such as mounting stud 416 and/or a threaded nut 456 received therealong, for example.

Figure 8:
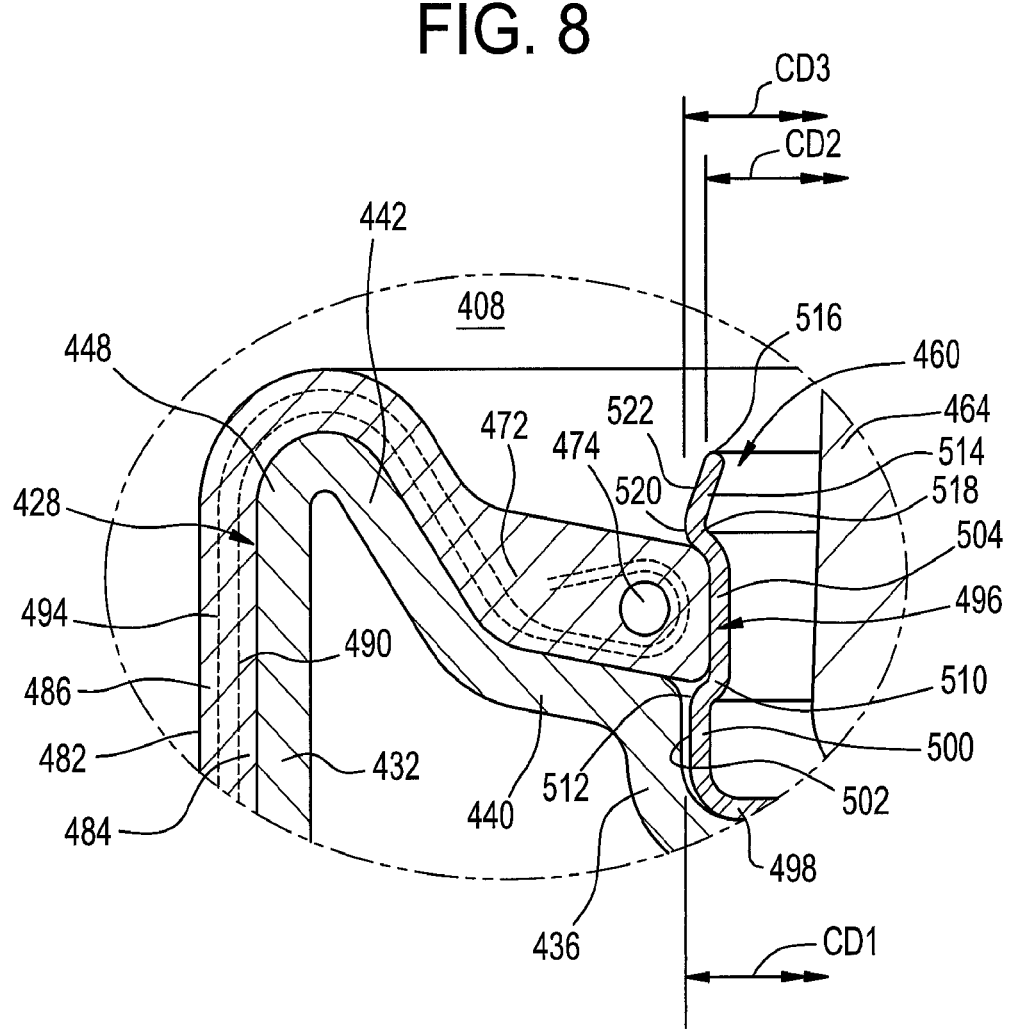
FIG. 8 is an enlarged, cross-sectional view of a portion of the gas spring assembly in FIGS. 6 and 7 identified as Detail 8 in FIG. 7.
Figure 9:
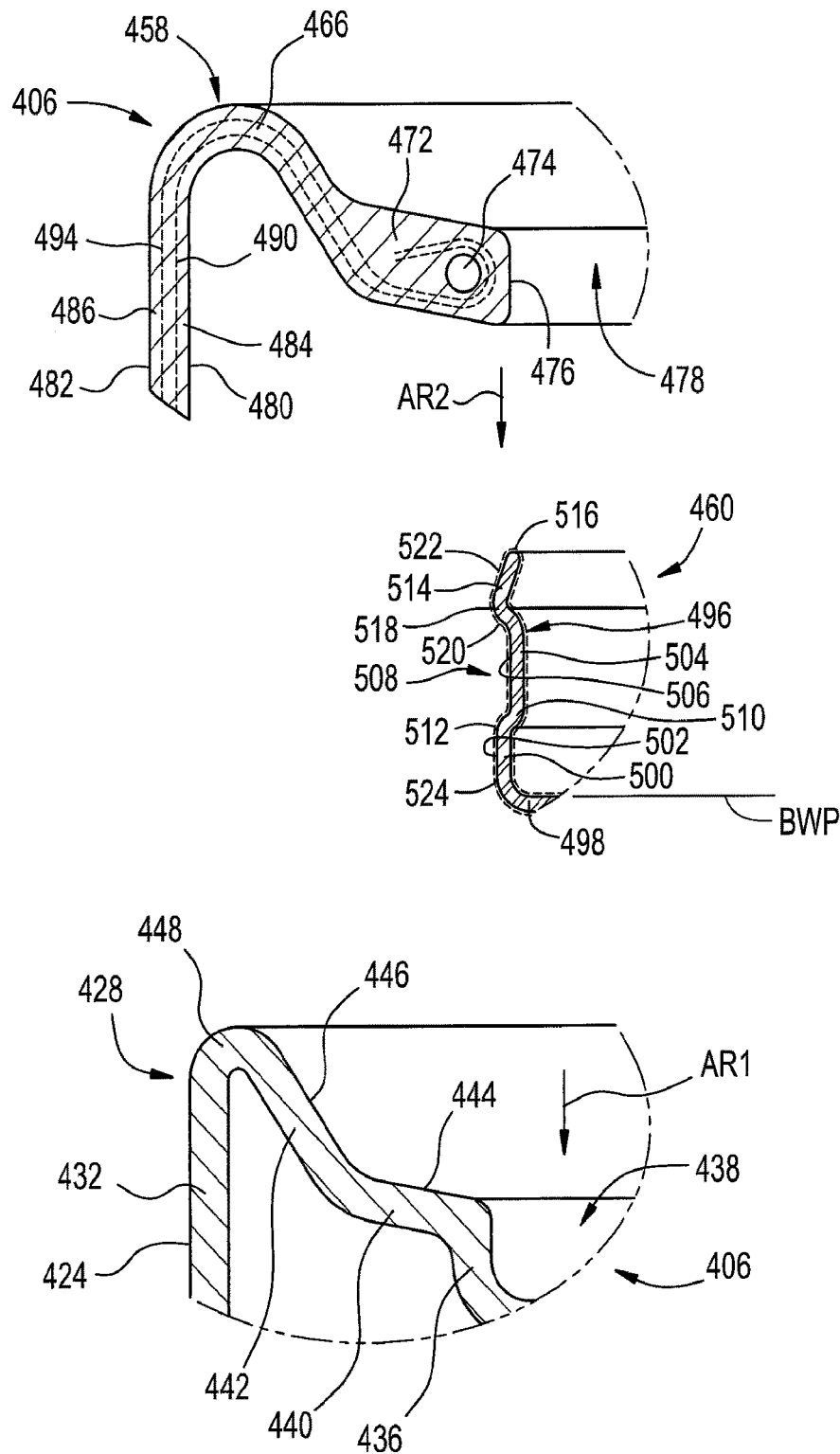
FIG. 9 is an exploded, cross-sectional side view of the portion of the gas spring assembly shown in FIG. 8.

One example of a connection between a flexible spring member and an end member in accordance with the subject matter of the present disclosure is shown in FIGS. 7-9 as including a second end 458 of flexible spring member 406 being secured on or along upper end 428 of end member 404 using an end closure 460. The end closure can be secured on or along end member 404 in any suitable manner. In the exemplary embodiment shown, a retaining nut 462 is threadably secured on mounting stud 416 and engages end closure 460. By securing mounting stud 416 on end member 404, such as by using threaded nut 456, for example, the end closure can be drawn tight to upper end 428 to thereby secure end closure 460 on or along end member 404. It is to be understood, however, that the arrangement shown and described is merely exemplary and that any other suitable construction and/or configuration can alternately be used.

In some cases, a jounce bumper 464 can, optionally, be supported within spring chamber 408, such as to inhibit direct contact between end members 402 and 404, for example. It will be appreciated that the jounce bumper, if included, can be supported on or along an end member in any suitable manner. For example, jounce bumper 464 is shown as being received on and retained by retaining nut 462.

Flexible spring member 406 can include a flexible wall 466 that can extend between first and second ends 420 and 458. As discussed above, it will be appreciated that end members 402 and 404 can be operatively connected to first and second ends 420 and 458 in any suitable manner. As such, flexible spring member 406 and flexible wall 466 thereof can include any suitable combination of one or more features on or along the first and/or second ends that may be suitable for facilitating such operative connections. As one example, flexible spring member 406 can include a mounting bead 468 disposed along end 420. Mounting bead 468 can extend peripherally around end 420 and can, optionally, include a bead reinforcement element 470, such as an endless, annular wire, for example. During assembly, outer peripheral portion 422 of the end member can be controllably deformed (e.g., crimped, swaged, pressed) into abutting engagement with flexible wall 406 such that mounting bead 468 is at least partially captured by the outer peripheral portion to form a crimped-edge connection with end member 402.

As another example, flexible spring member 406 can include a mounting bead 472 disposed along end 458. Mounting bead 472 can extend peripherally around end 458 and can, optionally, include a bead reinforcement element 474, such as an endless, annular wire, for example. In a preferred arrangement, flexible spring member 406 includes an inner end surface 476 (FIG. 9) that at least partially defines an opening 478 (FIG. 9) along end 458. Inner end surface 476 and opening 478 are preferably dimensioned to receivingly engage a surface, wall and/or wall portion of end closure 460 such that a substantially fluid-tight, friction-fit connection can be formed with the end closure. During assembly, end 458 of flexible spring member 406 and end closure 460 can be displaced relative to one another (e.g., in an axial direction toward one another) such that inner end surface 476 slides along one or more surfaces of end closure 460 and into position along a mounting region of the end closure, such as, for example, may be defined by one or more surfaces, walls and/or wall portions thereof.

It will be appreciated that flexible spring member 406 and flexible wall 466 thereof can be formed in any suitable manner and from any suitable material or combination of materials, such as by using one or more fabric-reinforced, elastomeric plies or layers and/or one or more un-reinforced, elastomeric plies or layers, for example. Typically, one or more fabric-reinforced, elastomeric plies and one or more un-reinforced, elastomeric plies will be used together and formed from a common elastomeric material, such as a synthetic rubber, a natural rubber or a thermoplastic elastomer. In other cases, however, a combination of two or more different materials, two or more compounds of similar materials, or two or more grades of the same material could be used.

As shown in FIGS. 7-9, for example, flexible wall 466 can include an outer surface 480 and an inner surface 482, which can at least partially define spring chamber 408. Additionally, as identified in FIG. 7, flexible wall 466 can include an outer or cover ply 484 that at least partially forms outer surface 480, an inner or liner ply 486 that at least partially forms inner surface 482. In a preferred arrangement, flexible wall 466 can also include one or more reinforcing plies disposed between outer and inner surfaces 480 and 482. The one or more reinforcing plies can be of any suitable construction and/or configuration. For example, the one or more reinforcing plies can include one or more lengths of filament material that are at least partially embedded therein. It will be appreciated that the one or more lengths of filament material can be of any suitable type, kind and/or construction, such as monofilament polymeric strands, braided cotton yarn or bundled carbon fibers, for example. Furthermore, such one or more lengths of filament material could optionally be coated or otherwise treated, such as, for example, to improve adhesion with the adjacent plies or other surrounding material. For example, the filament material could be rubber coated, such that upon applying a layer of rubber over the filament material improved adhesion between the various layers could result during and/or after vulcanization, for example.

Additionally, it will be appreciated that the one or more lengths of filament material, if provided, can be oriented in any suitable manner. As one example, flexible wall 466 is shown in FIGS. 6, 8 and 9 as including a plurality of filament segments 488 of one reinforcing ply 490 disposed at one bias angle BA1 (FIG. 6) and a plurality of filament segments 492 of another reinforcing ply 494 disposed another bias angle BA2 (FIG. 6). It will be appreciated that any suitable bias angles can be used, such as bias angles within a range of from approximately 3 degrees to approximately 87 degrees, for example. In some cases, the filament segments can be disposed at approximately the same bias angle but oriented in the opposing direction, such as is represented in FIG. 6 by reference dimensions BA1 and BA2, for example.

Gas spring assembly 400 differs from conventional constructions at least in that flexible wall 466 of flexible spring member 406 is in a substantially-cured condition prior to assembly with end closure 460. As such, second end 458 of flexible spring member 406 is secured on or along end closure 460 by way of a substantially fluid-tight, friction-fit (i.e., separable, re-usable or otherwise non-permanent) connection rather than by way of permanent (i.e., inseparable without damage, destruction or material alteration of at least one of the component parts) connection between the second end of the flexible spring member and the end closure. This permits the end of the flexible spring member and the end closure to be pressed or otherwise displaced relative to one another (e.g., in an axial direction toward one another) to form a snap-fit or otherwise radially-resilient connection during assembly. It will be appreciated that constructions in accordance with the subject matter of the present disclosure can include any suitable combination of features, elements and/or characteristics.

As one example, end closure 460 is shown in FIGS. 7-9 as including an end closure wall 496 that can be formed from any suitable material or combination of materials. In a preferred arrangement, end closure 460 and end closure wall 496 thereof are formed as a single, unitary component from a metal material, such as steel or aluminum, for example. It will be appreciated, however, that other configurations and/or constructions could alternately be used. End closure wall 496 includes a base wall (or base wall portion) 498 and one or more side walls (or side wall portions) that extend from the base wall portion and provide end closure 460 with a generally dish-shaped or cup-shaped configuration. Base wall portion 498 is disposed generally transverse to longitudinal axis AX and extends radially outward toward the one or more side wall portions. End closure wall 496 can include an inner edge (not numbered) that at least partially defines a hole or opening (not numbered) dimensioned to permit a securement device, such as mounting stud 416, for example, to extend therethrough. In some cases, a portion of retaining nut 462, such as an annular projection (not numbered), for example, can extend into the opening, such as to position and/or retain the retaining nut on or along end closure 460, for example.

Additionally, in the arrangement shown in FIGS. 7-9, end closure wall 496 can include an outer side wall (or outer side wall portion) 500 that extends from along base wall portion 498 and projects outward from base wall plane BWP (FIG.

9) that is at least partially formed by the base wall portion, such as in a generally axial direction, for example. Outer side wall portion 500 includes an outer surface 502 (FIG. 9) and a cross-sectional dimension along the outer surface, as is represented by reference dimension CD1 in FIG. 8. End closure wall 496 also includes an inner side wall (or inner side wall portion) 504 that is disposed axially outward from outer side wall portion 500 in a direction opposite base wall portion 498. Inner side wall portion 504 can include an outer surface 506 (FIG. 9) and a cross-sectional dimension along the outer surface, as is represented by reference dimension CD2 in FIG. 8. In a preferred arrangement, cross-sectional dimension CD2 of inner side wall portion 504 is less than cross-sectional dimension CD1 of outer side wall portion 500 such that a mounting region or seat 508 (FIG. 9) can be at least partially defined by outer surface 506 of inner side wall portion 504.

End closure wall 496 can include a shoulder wall (or shoulder wall portion) 510 disposed between outer side wall portion 500 and inner side wall portion 504. Shoulder wall portion 510 can include a shoulder surface 512 that extends between and operatively connects outer surfaces 502 and 506 such that a substantially-continuous, contoured surface profile can be formed along the exterior of end closure wall 496. Additionally, end closure wall 496 can include a flange wall (or flange wall portion) 514 that extends from along the inner side wall portion 504 in a radially inward direction to a distal edge 516. End closure wall 496 can also include a shoulder wall (or shoulder wall portion) 518 disposed between inner side wall portion 504 and flange wall portion 514. Shoulder wall portion 518 can include a shoulder surface 520 that extends between and operatively connects outer surface 506 and a surface 522 of flange wall portion 516 such that a substantially-continuous, contoured surface profile can be formed along the exterior of end closure wall 496. Shoulder wall portion 518 and/or shoulder surface 520 thereof can include a cross-sectional dimension, as is represented by reference dimension CD3 in FIG. 8. In a preferred arrangement, cross-sectional dimension CD3 of shoulder wall portion 518 is greater than cross-sectional dimension CD2 of inner side wall portion 504 such that mounting region or seat 508 (FIG. 9) can be at least partially defined by outer surface 506 of inner side wall portion 504.

Prior to assembly, flexible spring member 406 can be provided in a substantially-cured condition separate and apart from end closure 466 and end member 404, such as is shown in FIG. 9, for example. During assembly, end closure 460 can be positioned on or along end member 404, such as is represented in FIG. 9 by arrow AR1. Once positioned, the end closure can be secured on or along the end member, such as through the use of mounting stud 416 and threaded nut 456, for example.

Once end closure 460 is secured on or along the end member, end 458 of flexible spring member 406 can be positioned on or along surface 522 or another feature of end closure 460. In such condition, the end of the flexible spring member can be pressed or otherwise displaced in a direction toward end closure 460, such as is represented in FIG. 9 by arrow AR2. During such an action, inner end surface 476 and opening 478 formed along end 458 of the flexible spring member are stretched over (e.g., radially-resiliently displaced) and slide along surface 522 of flange wall portion 516 as well as over and along shoulder surface 520 of shoulder wall portion 518. In a preferred arrangement, such an action can continue until at least a portion of inner end surface 476 is disposed along outer surface 506 of inner side wall portion 504 and at least partially received within mounting seat 508. In a preferred arrangement, end 458 of flexible spring member 406 can be disposed in abutting engagement at least a portion of one or more of shoulder surfaces 512 and/or 520, such as may assist in retaining the end of the flexible spring member in position within mounting seat 508 and/or otherwise along inner side wall portion 504 of end closure 460.

It will be appreciated that such constructions can permit the end closure to include one or more additional features, elements and/or characteristics. For example, end closure 460 can include one or more coatings and/or layers formed along at least a portion of the exterior thereof, such as is represented in FIG. 9 by dashed line 524, for example. One non-limiting example of a suitable coating and/or layer can include a corrosion resistant coating.

As used herein with reference to certain features, elements, components and/or structures, numerical ordinals (e.g., first, second, third, fourth, etc.) may be used to denote different singles of a plurality or otherwise identify certain features, elements, components and/or structures, and do not imply any order or sequence unless specifically defined by the claim language. Additionally, the terms "transverse," and the like, are to be broadly interpreted. As such, the terms "transverse," and the like, can include a wide range of relative angular orientations that include, but are not limited to, an approximately perpendicular angular orientation.

Furthermore, the phrase "flowed-material joint" and the like are to be interpreted to include any joint or connection in which a liquid or otherwise flowable material (e.g., a melted metal or combination of melted metals) is deposited or otherwise presented between adjacent component parts and operative to form a fixed and substantially fluid-tight connection therebetween. Examples of processes that can be used to form such a flowed-material joint include, without limitation, welding processes, brazing processes and soldering processes. In such cases, one or more metal materials and/or alloys can be used to form such a flowed-material joint, in addition to any material from the component parts themselves. Another example of a process that can be used to form a flowed-material joint includes applying, depositing or otherwise presenting an adhesive between adjacent component parts that is operative to form a fixed and substantially fluid-tight connection therebetween. In such case, it will be appreciated that any suitable adhesive material or combination of materials can be used, such as one-part and/or two-part epoxies, for example.

Further still, terms such as "gas," "pneumatic" and "fluid" as well as variants thereof, are used herein to broadly refer to and include any gaseous or vaporous fluid. Most commonly, air is used as the working medium of gas spring devices, such as those described herein, as well as suspension systems and other components thereof. However, it will be understood that any suitable gaseous fluid could alternately be used.

It will be recognized that numerous different features and/or components are presented in the embodiments shown and described herein, and that no one embodiment is specifically shown and described as including all such features and components. However, it is to be understood that the subject matter of the present disclosure is intended to encompass any and all combinations of the different features and components that are shown and described herein, and, without limitation, that any suitable arrangement of features and components, in any combination, can be used. Thus it is to be distinctly understood claims directed to any such combination of features and/or components, whether or not specifically embodied herein and whether or not initially presented in herein, are intended to find support in the present disclosure.

Thus, while the subject matter of the present disclosure has been described with reference to the foregoing embodiments and considerable emphasis has been placed herein on the structures and structural interrelationships between the component parts of the embodiments disclosed, it will be appreciated that other embodiments can be made and that many changes can be made in the embodiments illustrated and described without departing from the principles hereof. Obviously, modifications and alterations will occur to others upon reading and understanding the preceding detailed description. Accordingly, it is to be distinctly understood that the foregoing descriptive matter is to be interpreted merely as illustrative of the subject matter of the present disclosure and not as a limitation. As such, it is intended that the subject matter of the present disclosure be construed as including all such modifications and alterations insofar as they come within the scope of the appended claims and any equivalents thereof.

The invention claimed is:

1. An end closure dimensioned to secure an associated flexible spring member in at least a substantially-cured condition along an associated gas spring end member, said end closure comprising an end closure wall having a longitudinal axis and including:
   an end wall portion disposed transverse to said longitudinal axis and dimensioned for securement in abutting engagement with the associated end member;
   a first side wall portion disposed radially outward of said longitudinal axis and extending from along said end wall portion in a first axial direction;
   a second side wall portion disposed radially inward of said first side wall portion, said second side wall portion extending from along said first side wall portion in at least said first axial direction and in axially-offset relation to said end wall portion; and,
   at least one of a flange wall portion and a shoulder wall portion extending radially outward from along said second side wall portion in at least said first axial direction and in axially-offset relation to said first side wall portion such that a mounting seat is at least partially formed by said second side wall portion between said first side wall portion and said at least one of said flange wall portion and said shoulder wall portion, said mounting seat dimensioned to form a substantially fluid-tight, friction-fit connection between at least said second side wall portion of said end closure and the associated flexible spring member.

2. An end closure according to claim 1, wherein said at least one of said flange wall portion and said shoulder wall portion includes a flange wall portion extending radially outward beyond said second side wall portion.

3. An end closure according to claim 1, wherein said at least one of said flange wall portion and said shoulder wall portion includes a flange wall portion extending radially inward beyond said second side wall portion.

4. An end closure according to claim 2, wherein said at least one of said flange wall portion and said shoulder wall portion includes a first shoulder wall portion extending between said flange wall portion and said second side wall portion such that a substantially-continuous contoured surface profile is formed along said second side wall portion, said first shoulder wall portion and said flange wall portion.

5. An end closure according to claim 1, wherein said end closure wall includes a second shoulder wall portion extending between said first side wall portion and said second side wall portion such that a substantially-continuous contoured surface profile is formed along said first side wall portion, said second shoulder wall portion and said second side wall portion.

6. A gas spring assembly comprising:
   a flexible spring member having a longitudinal axis and including a flexible wall extending peripherally about said longitudinal axis, said flexible spring member extending longitudinally between opposing first and second ends and at least partially defining a spring chamber therebetween, said flexible wall being formed from a quantity of elastomeric material that is in an at least substantially-cured condition and including an end surface disposed along said second end of said flexible spring member;
   a first end member dimensioned for securement to an associated first structural component, said first end member extending across said first end of said flexible spring member and secured thereto such that a substantially fluid-tight seal is formed therewith;
   a second end member dimensioned for securement to an associated second structural component and in spaced relation to said first end member, said second end member abuttingly engaging said flexible spring member such that a rolling lobe can be formed by said flexible spring member along said second end member; and,
   an end closure secured to said second end member and dimensioned to form a radially-resilient, snap over-type engagement of said end surface with said end closure such that a substantially fluid-tight, friction-fit connection with said flexible spring member is generated upon receivingly engaging said second end of said flexible spring member while in said at least substantially-cured condition thereof, said end closure including an end closure wall with:
      an end wall portion disposed transverse to said longitudinal axis and dimensioned for securement in abutting engagement along said second end member;
      a first side wall portion disposed radially outward of said longitudinal axis and extending from along said end wall portion in a first axial direction; and,
      a second side wall portion disposed radially inward of said first side wall portion, said second side wall portion extending from along said first side wall portion in at least said first axial direction and in axially-offset relation to said end wall portion.

7. A gas spring assembly according to claim 6, wherein said end closure wall of said end closure includes at least one of a flange wall portion and a shoulder wall portion extending radially outward from along said second side wall portion in at least said first axial direction and in axially-offset relation to said first side wall portion such that a mounting seat is at least partially formed by said second side wall portion between said first side wall portion and said at least one of said flange wall portion and said shoulder wall portion, said mounting seat dimensioned to form said substantially fluid-tight, friction-fit connection between at least said second side wall portion of said end closure and said second end of said flexible spring member while in said at least substantially-cured condition thereof.

8. A gas spring assembly according to claim 7, wherein said at least one of said flange wall portion and said shoulder wall portion includes a flange wall portion extending radially outward beyond said second side wall portion.

9. A gas spring assembly according to claim 7, wherein said at least one of said flange wall portion and said shoulder wall portion includes a flange wall portion extending radially inward beyond said second side wall portion.

10. A gas spring assembly according to claim 8, wherein said at least one of said flange wall portion and said shoulder wall portion includes a first shoulder wall portion extending between said flange wall portion and said second side wall portion such that a substantially-continuous contoured surface profile is formed along said second side wall portion, said first shoulder wall portion and said flange wall portion.

11. A gas spring assembly according to claim 6, wherein said end closure wall includes a second shoulder wall portion extending between said first side wall portion and said second side wall portion such that a substantially-continuous contoured surface profile is formed along said first side wall portion, said second shoulder wall portion and said second side wall portion.

12. A suspension system comprising:
   a pressurized gas system including a pressurized gas source and a control device; and,
   at least one gas spring assembly according to claim 6 disposed in fluid communication with said pressurized gas source through said control device such that pressurized gas can be selectively transferred into and out of said spring chamber.

13. A method of assembling a gas spring assembly, said method comprising:
   providing a flexible spring member having a longitudinal axis and extending peripherally about said longitudinal axis between opposing first and second ends, said flexible spring member at least partially formed from an elastomeric material in a substantially-cured condition;
   providing an end closure including:
      an end wall portion;
      a first side wall portion disposed radially outward of said longitudinal axis and extending from along said end wall portion in a first axial direction, said first side wall portion dimensioned to receivingly engage said first end of said flexible spring member; and,
      a second side wall portion disposed radially inward of said first side wall portion, said second side wall portion extending from along said first side wall portion in at least said first axial direction and in axially-offset relation to said end wall portion;
   providing a first end member and securing said end closure on said first end member to form an end member and end closure assembly; and,
   displacing said first end of said flexible spring member in said substantially-cured condition and said end member and end closure assembly relative to one another such that said first end undergoes radially-resilient, snap over-type engagement along said side wall portion and thereby forms a substantially fluid-tight, friction-fit connection between said end closure and said first end of said flexible spring member.

14. A method according to claim 13 further comprising:
   providing a second end member; and,
   securing said second end member across said second end of said flexible spring member such that a substantially fluid-tight seal is formed therebetween.

15. A method according to claim 13, wherein displacing said first end to of said flexible spring member and said end member and end closure assembly relative to one another to form said substantially fluid-tight, friction-fit connection is completed after securing said end closure to said first end member.

16. A method according to claim 13, wherein providing said end closure includes providing at least one of a flange wall portion and a shoulder wall portion extending radially outward from along said second side wall portion in at least said first axial direction and in axially-offset relation to said first side wall portion such that a mounting seat is at least partially formed by said second side wall portion between said first side wall portion and said at least one of said flange wall portion and said shoulder wall portion.

\* \* \* \* \*